2,908,681
Patented Oct. 13, 1959

2,908,681
ESTERS OF 2-HYDROXYPROPYLSUCROSE

Arthur W. Anderson and Juel L. Melstad, Midland, Mich., assignors to The Dow Chemical Company, Midland, Mich., a corporation of Delaware No Drawing. Application February 25, 1957
Serial No. 641,834

12 Claims. (Cl. 260—234)

This invention relates to fatty acid esters of octakis-(2-hydroxypropyl)-sucrose wherein from 1 to 8 of the hydroxyl groups have been esterified. Such esters may be represented by the formula $$(RCO)_n\text{—}X$$

wherein RCO is the acyl radical of a fatty acid, i.e. R represents hydrogen or an aliphatic hydrocarbon radical; $n$ is an integer in the range 1 to 8 and X is the residue of octakis-(2-hydroxypropyl)-sucrose after the hydrogen atoms of $n$ hydroxyl groups have been removed.

The preferred acids for making the esters of the invention are those containing 12 to 18 carbon atoms such as lauric, myristic, palmitic, stearic, oleic, linoleic, linolenic and ricinoleic acid and the like.

The octakis-(2-hydroxypropyl)-sucrose used in making the esters of the invention may be prepared by any suitable method, a preferred procedure being that disclosed in the copending application of one of us (Arthur W. Anderson) entitled "Hydroxypropylation Of Hydroxy Compounds," filed December 24, 1956; Serial No. 630,067.

The compounds of the invention may be made by various methods. Thus, the fatty acid may be reacted with propylene oxide or propylene glycol to form the monoester of propylene glycol. The latter may then be reacted with sucrose to form the desired ether-ester. A preferred synthesis comprises reacting sucrose with propylene oxide to form octakis-(2-hydroxypropyl)-sucrose and then acylating the latter. The acylation may be effected by use of any suitable acylating agent, such as the free acid, the acid anhydride, the acyl halide or an ester of the acid and a volatile alcohol. For reasons of convenience and economy, the preferred acylating agent is an ester, preferably the methyl ester, of the acid, except in those cases where the acid anhydride is readily available at low cost.

Since hydroxypropyl-sucrose has 8 alcoholic hydroxyl groups, from 1 to 8 acyl groups may be put onto the molecule. The degree of acylation is readily controlled by adjustment in the number of moles of acylating agent used and/or by interrupting the acylation reaction when the desired number of acyl groups have been introduced.

The properties of the products of the invention cover a wide range and are dependent on the nature and number of acyl groups in the compound. In general, they are water- and/or oil-soluble surfactants useful as wetting and emulsifying agents, detergents or anti-foam agents. The lower fatty acid esters, e.g. the acetates, are excellent anti-foam agents and are also good plasticizers for cellulosic plastics, particularly ethylcellulose. Esters of the higher fatty acids, that is those containing 12 to 18 carbon atoms, are outstanding non-toxic emulsifiers and as such are valuable in the food, cosmetics and pharmaceutical fields. Those esters containing one or more polymerizable unsaturated group, such as the acrylate, methacrylate, undecylenate, linoleate and linolenate, are useful monomers for modifying the common vinyl polymers such as the polymers of methyl methacrylate, vinyl esters and ethers, styrene, etc. Some of these esters, particularly the acrylate and methacrylate, may be homopolymerized by conventional methods. The polymers thus formed vary widely in properties, depending on the number of polymerizable double bonds in the molecule. Thus, the mono-esters yield linear, thermoplastic, water-soluble resins useful as thickening agents for aqueous compositions while the di-, tri- and higher esters form cross-linked gels, even in dilute solvent media. The esters of the higher unsaturated acids, i.e. the drying oil acids, such as the linoleate, linolenate, etc., are useful in surface coating compositions and as modifiers in alkyd and polyurethane resins. They are especially versatile in the latter application because of their high functionality. Thus, the tri-esters not only carry three unsaturated fatty acid groups, as do the best drying oils, but they also carry five reactive hydroxyl groups and thus are easily incorporated into alkyd or urethane resin compositions. The eight reactive groups in the molecules may be apportioned in any desired way between fatty acid radicals and alcoholic hydroxyl groups.

The preparation of the esters of the invention by transesterification is illustrated by the following example.

EXAMPLE 1.—MONOSTEARATE

Equimolecular quantities of methyl stearate and octakis-(2-hydroxypropyl)-sucrose, together with 0.5 percent by weight, based on the total weight of reactants, of sodium methoxide, were placed in a reaction kettle fitted with stirrer, thermometer, heater and vacuum line.

The temperature was raised to and held at 100–120° C. while the pressure was maintained at about 80 mm. Heating and stirring were continued until substantially the theoretical amount of methanol had been removed (collected in a cold trap in the vacuum line) and its production had practically ceased. The crude product, a thick yellow to brown sirup, was bleached by the addition of 1 percent of 30 percent $H_2O_2$ before being cooled. The catalyst was neutralized with carbon dioxide. Some properties of the product are shown in Tables I and II.

The procedure described above can be readily adapted to the production of other esters. For the production of di-, tri- and higher esters, including the octa-ester, the appropriate number of molar equivalents of the methyl ester is used and, usually, a longer reaction period is required. Instead of the methyl ester, we may use the ethyl or other lower alkyl ester. However, the methyl ester is generally preferred because of its ease of preparation and the volatility of its alcohol.

Other alkaline esterification catalysts, such as alkali or alkaline earth hydroxides or alcoholates or aluminum alcoholates may be used instead of sodium methoxide.

While an inert solvent may be included in the reaction mixture, it is unnecessary and, in general, undesirable.

The catalyst may be neutralized, after the reaction is complete, by addition of a weak acid, such as acetic, instead of carbon dioxide. Sometimes it is desirable to use the same acid for neutralization that is used for esterification.

EXAMPLE 2.—OCTA-ACETATE

This example illustrates esterification by use of acid anhydrides.

A mixture of 540 grams of octakis-(2-hydroxypropyl)-sucrose and 95 grams of acetic anhydride was slowly added to a mixture of 445 grams of acetic anhydride and 22.5 grams of sodium acetate after the latter mixture was warmed to 70° C. The temperature rose to 120° C. during the addition and was maintained at 110–120° for 35 minutes thereafter. The mixture was then cooled and stirred into 3.5 liters of cold water, separated by decantation and washed twice more, diluted with benzene, dried over calcium chloride, again washed with water, and evaporated to dryness on a steam bath under vacuum.

The product (590 grams) was a light amber, viscous liquid, insoluble in water but soluble in most organic solvents. Its analysis showed 0.67 percent hydroxyl and 28.65 percent acetyl, corresponding to 7.5 acetyl groups per mole.

The octa-acetate showed excellent foam-suppressant properties and is an excellent plasticizer for ethyl cellulose. In the latter application it shows the unusual property of greatly increasing the adhesion of the plastic to various surfaces, especially glass.

EXAMPLE 3.—OCTALAURATE

The basic method used was that of Example 1.

A mixture of 800 grams (1 mole) of octakis-(2-hydroxypropyl)-sucrose and 1714 grams (8 moles) of methyl laurate was heated at 120° C. and 70–80 mm. pressure with periodic addition of a few grams of sodium methoxide. After a reaction time of 8.5 hours the catalyst was neutralized with acetic acid and the product was bleached by the addition of 1 percent of 30 percent $H_2O_2$.

The product was a yellow oily liquid which exhibited excellent surfactant properties.

EXAMPLE 4.—MONOACRYLATE

A mixture of 400 grams of octakis-(2-hydroxypropyl)-sucrose, 55 grams of ethyl acrylate, 2.2 grams of hydroquinone and 1.4 grams of sodium methoxide was refluxed for 15 hours with intermittent distillation of the ethanol-ethyl acrylate azeotrope to remove the by-product ethanol. After 12 hours of reflux, 25 ml. of benzene were added to obtain better reflux without raising the reaction temperature above 90° C.

The catalyst was neutralized with acetic acid and the product was decolorized with charcoal. The product obtained by vacuum distillation of the benzene and remaining ethyl acrylate was a clear, amber, sirupy liquid. It readily polymerized to form a solid when warmed with a little organic peroxide.

Table I shows some of the esters made, together with certain of their physical and chemical properties.

Table II shows some of the surfactant properties on the same compounds. As is shown by these data, all the compounds are potent surfactants. Since the compounds vary widely in specific surfactant properties such as formation or suppression of foam, detergency, emulsifying power, etc., great flexibility is affforded in the formulation of a surfactant for a specific purpose.

*Table I*

PROPERTIES OF ESTERS OF OCTAKIS-(2-HYDROXYPROPYL)-SUCROSE

| Cpd. No. | Ester | Percent OH Found | Percent OH Theory | Gardner Color | Solubility[a] Water | Acetone | Alcohol | Xylene | Kerosene |
|---|---|---|---|---|---|---|---|---|---|
| 1 | Monostearate | 10.64 | 11.10 | solid | D | A | A | B | C |
| 2 | Distearate | 7.72 | 7.63 | solid | D | B | B | A | A |
| 3 | Tristearate | 6.01 | 5.29 | solid | D | B | B | A | A |
| 4 | Monopalmitate | 10.22 | 11.40 | 8 | A | A | A | B | C |
| 5 | Dipalmitate | 7.80 | 7.96 | 13 | C | A | A | A | B |
| 6 | Tripalmitate | 6.07 | 5.59 | 10 | E | A | A | A | A |
| 7 | Monomyristate | 9.86 | 11.73 | 3 | A | A | A | B | C |
| 8 | Dimyristate | 8.45 | 8.33 | 8 | C | A | A | A | B |
| 9 | Trimyristate | 6.04 | 5.92 | 11 | E | A | A | A | A |
| 10 | Monolaurate | 11.56 | 12.05 | 9 | A | A | A | C | D |
| 11 | Dilaurate | 7.96 | 8.73 | 7 | B | A | A | A | B |
| 12 | Trilaurate | 6.24 | 6.29 | 7 | E | A | A | A | B |
| 13 | Octalaurate | | 0.00 | 6 | E | A | A | A | A |
| 14 | Octaacetate | 0.67 | 0.00 | 7 | I | A | A | A | D |
| 15 | Monooleate | 10.32 | 11.12 | 11 | A | A | A | B | C |
| 16 | Dioleate | 7.60 | 7.65 | 8 | D | A | A | A | C |
| 17 | Trioleate | 5.02 | 5.31 | 13 | E | A | A | A | A |
| 18 | Monolinoleate | 11.29 | 11.18 | 9 | D | A | A | A | D |
| 19 | Dilinoleate | 8.17 | 7.67 | 11 | D | A | A | A | A |
| 20 | Trilinoleate | 5.62 | 5.34 | 10 | D | A | A | A | A |
| 21 | Monoricinoleate | 11.08 | 10.96 | 11 | B | A | A | B | C |
| 22 | Monosorbate | Polymerized | | | | | | | |
| 23 | Monoacrylate | 11.30 | 13.85 | | A | A | A | D | D |
| 24 | Monohydroxystearate | 11.85 | 12.50 | | C | A | A | C | D |
| 25 | Monocaprate | 12.07 | 12.40 | | A | A | A | C | D |

[a] Solubility is indicated as follows:
A = over 25 percent by weight.
B = 10 to 25 percent.
C = 1 to 10 percent.
D = less than 1 percent.
E = insoluble but self-dispersing.
I = insoluble.

*Table II*

SURFACTANT PROPERTIES OF ESTERS OF TABLE I[a]

| cpd. No. | Surface Tension,[b] dynes/cm. | | | Interfacial Tension,[c] dynes/cm. | | |
|---|---|---|---|---|---|---|
| | 1 Percent | 0.1 Percent | 0.01 Percent | 1 Percent | 0.1 Percent | 0.01 Percent |
| 1 | 31.8 | 34.7 | 37.2 | 1.2 | 3.8 | 5.8 |
| 2 | 33.9 | 35.1 | 39.2 | 2.0 | 3.6 | 7.8 |
| 3 | 36.8 | 37.3 | 38.1 | 1.2 | 3.0 | 8.5 |
| 4 | 30.6 | 32.1 | 37.3 | 0.5 | 2.3 | 5.4 |
| 5 | 32.7 | 37.4 | 40.8 | 0.7 | 6.8 | 9.7 |
| 6 | 30.5 | 33.1 | 45.4 | 0.3 | 0.5 | 12.7 |
| 7 | 31.1 | 32.6 | 35.7 | 1.0 | 1.1 | 2.8 |
| 8 | 30.4 | 34.5 | 37.8 | 1.0 | 3.0 | 8.2 |
| 9 | 29.3 | 38.2 | 41.5 | 0.3 | 6.5 | 10.3 |
| 10 | 28.1 | 29.0 | 39.8 | 1.2 | 1.6 | 8.4 |
| 11 | 30.3 | 34.8 | 40.1 | 0.3 | 1.6 | 11.8 |
| 12 | 29.4 | 30.9 | 33.7 | 0.5 | 1.6 | 12.0 |
| 13 | 28.7 | 29.3 | 29.8 | 0.5 | 0.6 | 0.5 |
| 14 | | | | | | |
| 15 | 36.4 | 38.4 | 38.2 | 5.8 | 6.4 | 6.4 |
| 16 | 30.5 | 35.5 | 38.4 | 1.9 | 6.9 | 17.2 |
| 17 | 30.1 | 35.9 | 49.4 | 0.4 | 7.4 | 11.1 |
| 18 | 32.0 | 33.0 | 36.0 | 0.7 | 2.1 | 3.3 |
| 19 | 32.0 | 36.5 | 38.9 | 0.6 | 5.3 | 7.7 |
| 20 | 31.2 | 32.0 | 40.7 | 0.3 | 2.5 | 9.9 |
| 21 | 34.2 | 36.0 | 38.1 | 1.8 | 2.4 | 9.7 |
| 24 | 35.0 | 35.2 | 36.1 | 2.5 | 4.5 | 7.1 |
| 25 | 29.7 | 30.4 | 32.9 | 1.5 | 1.7 | 4.0 |

[a] The compounds are numbered here in the same order as in Table I.
[b] Aqueous solutions at 25° C.
[c] Aqueous solutions vs. mineral oil at 25° C.

We claim:
1. An ester corresponding to the formula

$$(RCO)_n\text{--}X$$

wherein RCO is the acyl radical of a fatty acid containing 1 to 18 carbon atoms, $n$ is an integer from 1 to 8, inclusive, and X is the residue of octakis-(2-hydroxypropyl)-sucrose after the hydrogen atoms of $n$ hydoxyl groups have been removed.

2. An ester as defined in claim 1 wherein the acid is a saturated fatty acid containing 2 to 18 carbon atoms.

3. An ester as defined in claim 2 wherein the acid is acetic acid.

4. An ester as defined in claim 2 wherein the acid is lauric acid.

5. An ester as defined in claim 2 wherein the acid is stearic acid.

6. An ester as defined in claim 1 wherein the acid is an olefinic fatty acid.

7. An ester as defined in claim 6 wherein the acid is oleic acid.

8. An ester as defined in claim 6 wherein the acid is linoleic acid.

9. An ester as defined in claim 1 wherein $n$ is 1.

10. An ester as defined in claim 1 wherein $n$ is 2.

11. An ester as defined in claim 1 wherein $n$ is 3.

12. An ester as defined in claim 1 wherein $n$ is 8.

References Cited in the file of this patent

UNITED STATES PATENTS

| | | |
|---|---|---|
| 1,959,930 | Schmidt et al. | May 22, 1934 |
| 2,626,935 | De Groote | Jan. 27, 1953 |

FOREIGN PATENTS

| | | |
|---|---|---|
| 494,644 | Canada | July 21, 1953 |
| 495,548 | Canada | Aug. 25, 1953 |